Nov. 26, 1929. O. W. STOREY ET AL 1,737,130
DRY CELL
Filed July 8, 1926 2 Sheets-Sheet 1
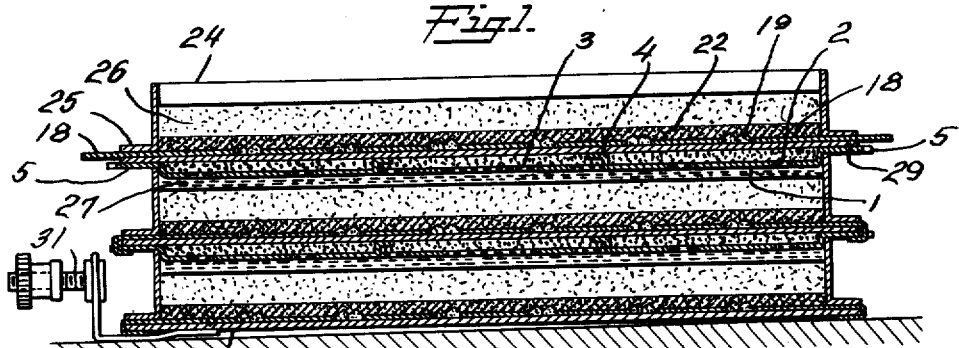
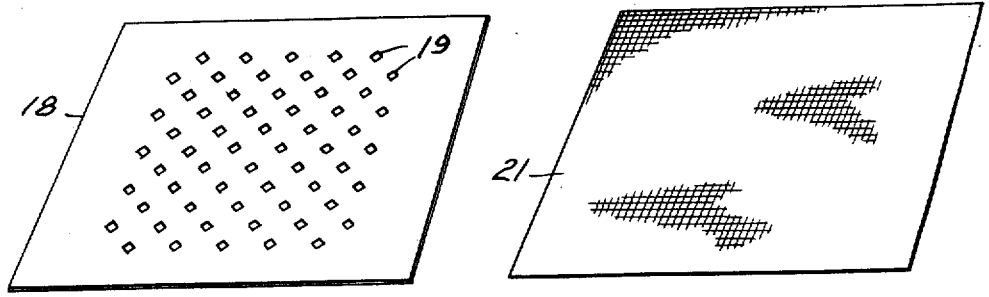
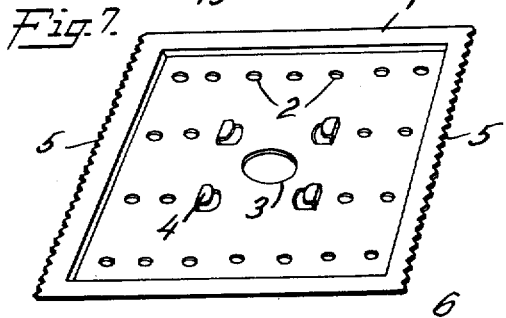
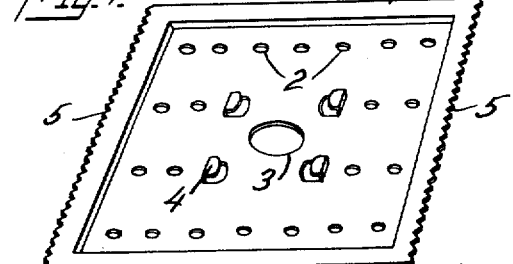
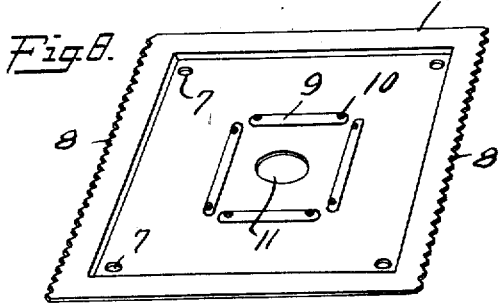
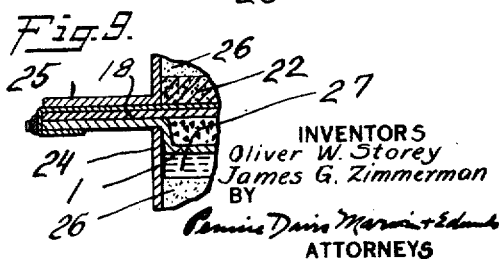
INVENTORS
Oliver W. Storey
James G. Zimmerman
BY
ATTORNEYS Nov. 26, 1929.    O. W. STOREY ET AL    1,737,130
DRY CELL
Filed July 8, 1926    2 Sheets-Sheet 2
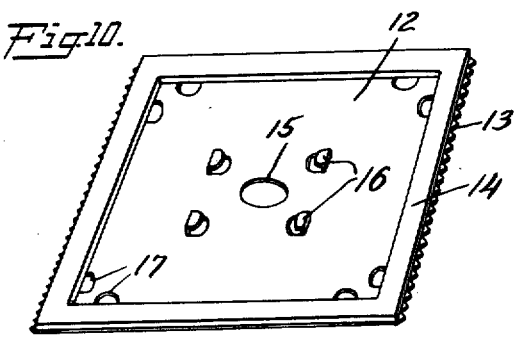
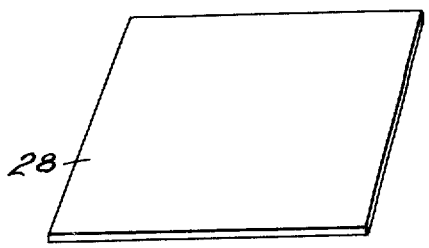
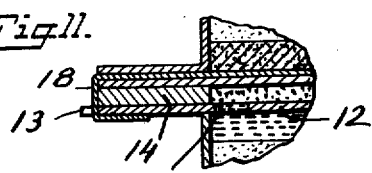
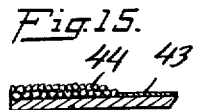
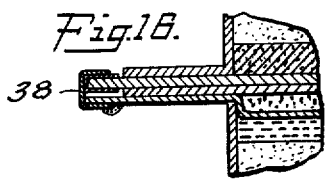
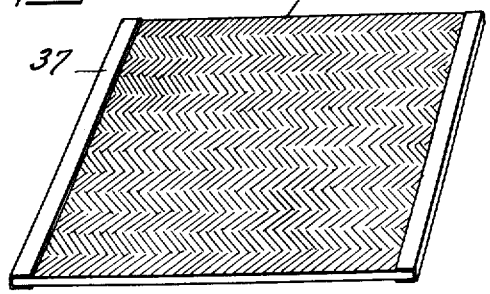
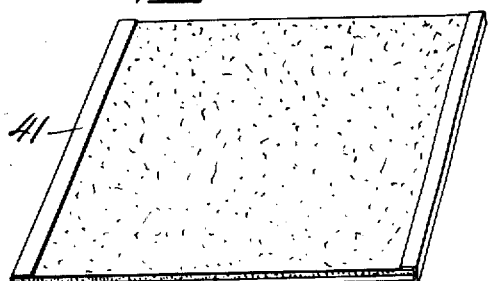
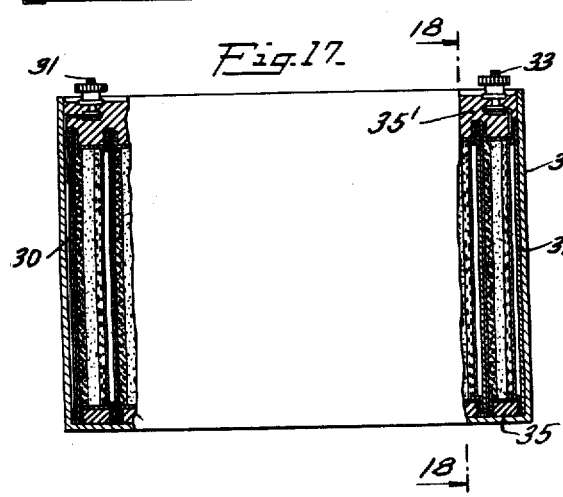
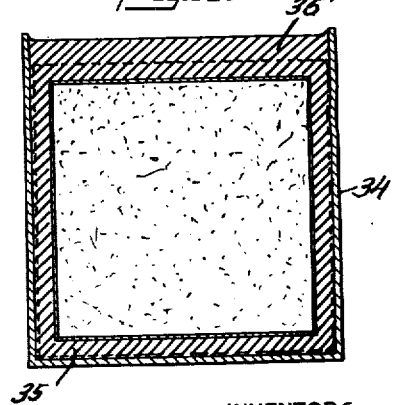
INVENTORS
Oliver W. Storey
James G. Zimmerman
BY
ATTORNEYS Patented Nov. 26, 1929

1,737,130

UNITED STATES PATENT OFFICE

OLIVER W. STOREY AND JAMES GARFIELD ZIMMERMAN, OF MADISON, WISCONSIN, ASSIGNORS TO C. F. BURGESS LABORATORIES, INC., OF MADISON, WISCONSIN, A CORPORATION OF DELAWARE

DRY CELL

Application filed July 8, 1926. Serial No. 121,132.

Our invention relates to dry cells of the flat or tray type and has particular reference to improvements in electrode construction of such cells, in methods of assembling the several elements into unitary cells, and improvements in the grouping of such cells into a complete battery.

It is the object of our invention to so improve dry cells of the flat type that the internal resistance will be cut down appreciably; to form an expansion space into which the expanding electrolyte, gases and other material may readily travel and which will therefore prevent the zinc chloride from expanding through the joints of the cell; to so construct and assemble the elements as to prevent leaky cells and bulging; to provide a practical construction for the use of a gelatinizable electrolyte; to use a much smaller amount of zinc in the construction of the cell and to secure a high efficiency in the consumption of this zinc; to provide positive insulation between such parts of the cell as should be so insulated; to provide for easy and effective electrical connection between adjacent cells; and to allow the separate manufacture of the component cells of a battery, thereby allowing such cells to be separately tested before assembly into a battery.

Other objects and advantages of the construction claimed herein will become clear from the following detailed description taken in conjunction with the accompanying drawings wherein:

Fig. 1 is a sectional elevation of three cells assembled as part of a battery;

Fig. 2 is a perspective view of a perforated metal plate used as a part of the cathode of a cell;

Fig. 3 is an enlarged section through a part of the plate shown in Fig. 2;

Fig. 4 shows that same plate supplied with a molded carbon cathode block;

Fig. 5 is a perspective view of a modified form of cathode-backing plate;

Fig. 6 is a perspective view of a fibrous insulating collar used to space the anode from the cathode and as a receptacle for some of the elements;

Figs. 7 and 8 are perspective views of modified forms of anodes;

Fig. 9 is a fragmentary section showing how an anode plate can be connected to the metal backing of the cathode of an adjacent cell;

Fig. 10 is a perspective view of a modified form of anode. This form comprises a flat metal plate bordered by an insulating rim;

Fig. 11 is a fragmentary section showing how the anode of Fig. 10 can be assembled with the adjacent elements:

Fig. 12 shows a paper liner which can be used in place of a layer of gelatinized electrolyte;

Fig. 13 is a perspective view of a cathode consisting essentially of a molded carbon block with electro-plating on its ends to facilitate electrical connection with an adjacent electrode;

Fig. 14 is a perspective view of a cathode consisting essentially of a metal or carbon backing-plate faced on one side with a layer of molded carbon to serve as the active face of the electrode. This electrode is provided with copper-plating along two of its edges to facilitate electrical connection;

Fig. 15 is a fragmentary detail of a cathode comprising a metal or carbon backing-plate faced with carbon granules held in place on the backing-plate and in electrical contact therewith by means of a film of gutta percha spread on the backing-plate.

Fig. 16 is a fragmentary section illustrating how an anode may be electrically connected to the electro-plated edge of a carbon cathode plate;

Fig. 17 is a fragmentary sectional elevation of a battery of cells arranged vertically and equipped with end plates provided with terminals which are embedded in the pitch or wax seal at the top of the battery; and Fig. 18 is a vertical section through Fig. 17 on the line 18—18.

An anode 1 shown in Fig. 7 is of sheet zinc pressed into the form of a shallow pan, the bottom of the pan being provided with a plurality of perforations 2 and preferably with a large central perforation 3. Pressed up from the material of the pan bottom are a plurality of lugs or projections 4, each of which has a height substantially equal to the depth of the pan. Preferably the pan is rectangular in shape and its flat rim has one or more serrated edges 5.

The anode 6 of Fig. 8 is of similar construction with perforations 7 in its four corners, with serrated edges 8, and with ribs or projections 9 pressed up from the bottom of the pan to a height substantially equal to the depth of the pan. These projections or stops may be straight, as shown in Fig. 8, with small perforations 10 near the end of each, or may be formed as a ring, ribs or punch-marks preferably adjacent to or encircling the central perforation 11. It is one function of these projections 9 and of the corresponding lugs 4 of Fig. 7 to give mechanical support to a sheet of fabric, which, in the assembly of this cell is spread across the top of the pan to form an expansion chamber for gases, and even for liquids, given off from the cell during normal use.

The modified form of anode illustrated in Fig. 10 comprises a flat sheet of anode metal 12, such as zinc, with one or more serrated edges 13; this flat plate being bordered or framed by a rectangular rim 14 of insulating material such, for example, as hard rubber or bakelite. The zinc sheet has a central perforation 15 and integral upstanding lugs or projections 16, and adjacent to each corner the insulating frame is provided with holes 17, the principal function of which is to let air escape from beneath the zinc plate when a gelatinized electrolyte is poured through hole 15 during the assembly of the cell.

Various forms of cathodes can be used in combination with the anodes above described. The cathode illustrated in Figs. 1 to 4 inclusive is a composite structure embodying a flat thin metal sheet 18 (Fig. 2) punched with holes 19 as there shown, the metal from the holes being forced up as shown in Fig. 3 to form upstanding lugs or tangs 20. Preferably sheet 18 is made from thin tinfoil in which metallic tin is a major constituent. The tin may be alloyed with lead. Thin tin plate or terne plate can also be used, and we have successfully used for this purpose sheet zinc, sheet aluminum, and sheet iron and steel. This metal sheet takes no part in the electro-chemical action in the cell but serves as a backing plate for the carbonaceous portion of the cathode, and by establishing intimate electric connection with the carbonaceous material throughout substantially its entire area, gives to the cell, as a whole, a low internal resistance and other desirable characteristics. The backing plate, instead of being of sheet metal, may be a wire screen 21 as shown in Fig. 5, the wires of the screen being of tin or tinned iron or brass, aluminum, zinc, or other common metal.

The method used by us in providing the metal cathode-backing sheet 18 of Fig. 2, or sheet 21 of Fig. 5, with a carbonaceous working face comprises the tamping of a mixture of powdered carbonaceous material and a binder against the rough face of the backing-sheet. In Fig. 4, such a carbonaceous layer 22 is shown tamped down on the tangs 20. These tangs penetrate the carbonaceous mixture and interlock with it, particularly if the tamping pressure has been severe enough to upset the tangs or bend them back toward the sheet. Using the wire screen 21 as the backing-plate, there is this same interlocking between the metal and the mixture of powdered carbonaceous material and binder. The carbonaceous material may consist entirely of natural or artificial graphite or may consist of graphite diluted with carbon dust. The fineness of the grind is not of great importance, but we prefer to use material that will pass through a 200 mesh sieve. As a binder, we prefer to use paraffin, to the extent of about 15 to 20% by weight of the total mixture. There is advantage in performing this tamping operation with a roughened tamping tool so that the upper face of the carbonaceous layer 22 (Fig. 4) will be better suited for mechanical interlocking with the "mix cake" which, in a subsequent operation, is tamped in above the carbonaceous layer.

A preferred method, as hereinafter described more in detail, consists in tamping the carbonaceous layer and the "mix cake" simultaneously, to secure a close interlocking and a good intermingling at the surface of contact.

Another important element of the dry-cell is the insulating collar 24 shown in Fig. 6. This is rectangular in shape with outstanding flanges 25 along its lower edge and of such size that a metal anode can be placed on top of the collar with its depressed or cuffed portion lying just inside the walls of the collar. We prefer to make this collar square and to make all of the anodes exactly square so that in the operation of assembly, as carried out on a factory basis, the operatives need not stop to consider matters of length and breadth. The insulating collar 24 can be made of fibrous material, such as heavy pulp board, thoroughly impregnated with paraffin, but we have found that better results are obtained when such a fibrous collar is thoroughly impregnated with polymerized tung oil. The collar must be resistant to the action of chlorides, and inasmuch as zinc chloride readily reacts with cellulose, care must be taken to protect any fibrous collar used as an envelope for the active elements of the cell. Tung oil polymerized by heat has this protective capacity to a high degree.

To assemble the elements above described into a complete unitary cell the procedure is as follows:—Sheet 18 is placed on a flat surface with is roughened face upward. Insulating collar 24 is set down on it and stuck to it by means of a moisture-resistant adhesive such as a varnish or as asphaltic paint. The mixture of carbonaceous material and binder is then tamped into the box to form a dense even layer interlocking with the backing plate and preferably having a roughened face for better contact with the "mix cake" which is tamped in above. The "mix cake" 26 of Fig. 1 may comprise graphite, or a mixture of graphite and carbon finely divided and intimately mixed with an oxygen bearing compound such as manganese dioxide, together with the usual chloride salts and water. This material, in moist condition, is tamped into the box while in moist condition and makes close contact with the carbonaceous cathode, and serves as the depolarizer of the cell.

It is highly important that there be close contact between the depolarizing mix cake and and carbonaceous layer beneath. We find that this contact can be greatly improved by a modification in the procedure above described. That modification is as follows:— The mixture of carbonaceous material and binder is spread as a loose and untamped layer of substantially uniform thickness on the metal backing-plate then the moist depolarizing mixture is spread as a thin layer on the carbonaceous mixture, then, in a suitable tamperer or presser, and preferably with a single and powerful stroke, all of the materials above the metal plate are squeezed or tamped together. There is an intermingling of the two mixtures along their surface of contact and there is a close binding of one with the other, with the net result that there is a low resistance to the flow of electrical energy from one to the other and there is little danger of a subsequent stripping or cleaving of the molded material along the contact plane between the two mixtures.

In the assembled cell, a layer of electrolyte 27 (Fig. 1) is provided above the mix cake. This may consist of an aqueous solution of zinc and ammonium chlorides compounded in usual proportions and held in a sheet of paper board or liner such as the sheet 28 of Fig. 12. But as a marked improvement over that construction, we prefer to omit the pulp board and to use a chloride electrolyte of the gelatinizing type, as described in detail in Hambuechen Patent No. 1,292,764 and in Schulte Patent No. 1,370,056. An electrolyte of this type may be self-setting, as disclosed in those patents.

To use such an electrolyte, we proceed by first fitting a zinc anode pan, of one of the types shown in Figs. 7, 8 and 10, into the insulating collar 24, with its brim resting on the edge of the collar and its depressed or pan portion fitting snugly within the collar and spaced an adequate distance from the depolarizing mix cake beneath. Hot wax, paraffin or asphaltic paint can be used for sealing the joint between the zinc anode and the upper edge of the collar. To introduce a self-hardening gelatinizable electrolyte into the space over the depolarizing mix, as shown at 27 in Fig. 1, we pour the electrolyte, while still in a liquid condition, through the central opening 3 of the zinc anode. The air initially in the chamber escapes through the other perforations 2. It is desirable that there be no bubbles or air pockets on the lower face of the zinc, and the pouring of a slight excess of paste will do no harm, for it will merely well up through the perforations and lie in small pools on the upper surface of the zinc plate.

The structure so formed is then covered over with a square sheet of fibrous material 29, Fig. 1, the edge of which is cemented to the brim of the zinc pan with hot paraffin, asphaltic paint or the like, to make a tight joint. A very excellent material for use as the fibrous material is tissue paper heavily impregnated with polymerized tung oil to render the cellulose of the paper resistant to the zinc and other chlorides of the paste. Sheets so impregnated are substantially air tight and of good electrical resistance and can be relied on to insulate the anode 5 of one cell from the cathode backing-plate 18 of an adjoining cell connected in series therewith. The projections 4, pressed up from the bottom of the zinc pan, serve to give mechanical support to this sheet of tissue paper and to give mechanical support to the metal backing-plate of an adjoining cell.

The same general result of mechanically supporting the sheet and plate can be obtained by introducing blocks or strips of wood or pulp board to function in essentially the same way as the projections 4. When pulp board is used in this way, it can be moistened with electrolyte before assembly, and so will act as a small moisture reservoir—a feature of some importance in dry-cells of the pan type.

A dry cell, assembled as above described, can be used as a single cell, but ordinarily we assemble a group of such cells in series. Fifteen such cells make a good battery for radio use. Inasmuch as each cell is completed and sealed off independently of any other cell, the cells can be aged for a week or so and then tested singly before assembly into the complete battery. This permits the discarding of defective cells, for the defective cells will ordinarily show the results of these defects within a week. If the cells are to be assembled into batteries of relatively high voltage this aging is of much importance because, otherwise, a defective cell might go into the battery and render the entire battery unsalable. In this respect, the cells and batteries of the present invention are a radical departure from tray type plate batteries as heretofore constructed, for with those, it has been common practice to assemble the entire battery during the process of assembling the separate cells. Hence one defective cell in the battery makes it necessary to discard the entire battery as unmerchantable.

In assembling a plurality of our dry-cells into a battery, the cells are stacked one above another in a box, with the edges, preferably serrated, projecting beyond the spacing collars and beyond the fibrous insulating sheets. The tinfoil or other backing-plate of each cathode can then be bent into contact with the adjacent anode and there soldered or welded, as along the serreated edge of the anode, as illustrated in section in Fig. 9, where the thickness of some of the parts has been exaggerated for clarity of illustration. An electrical connection along two edges of the square anode plate is sufficient.

When the tinfoil is pressed over the serrated edge of the adjacent anode, punctures of the foil will result, and the solder can be applied to this row of punctures with good results, either by use of a soldering iron or by dipping the entire edge in molten solder.

After a series of cells have thus been assembled into a battery the cathode backing-sheet of the lowermost cell is re-enforced by a zinc or other metal plate 30, and a terminal 31 is secured thereto as by soldering. Similarly the other or anode end of the battery may be re-enforced by a rigid plate 32 (Fig. 17) laid over the tissue paper cover of the end cell and cemented to the adjacent zinc anode, to which a terminal 33 can be connected as shown in Fig. 17. Intermediate terminals can be attached to any of the anodes along their protruding edges.

To protect such a battery from physical injury during transportation and use, we prefer to seal it into a pasteboard carton 34, as shown in Figs. 17 and 18. The procedure is as follows:—Into the carton, while standing on its bottom as shown in Fig. 17, is poured a highly fluid insulating compound such as molten sealing wax or pitch 35. The battery is then lowered into the carton to embed the edges of the electrodes in the molten material. It makes but little difference how deep the molten pitch is, for any excess over what is needed to fill all spaces in the bottom of the battery wells up into the rectangular spaces between electrodes. While the pitch or wax is still hot, and preferably while it is still molten, additional wax or pitch is poured in to form a top seal 35', nearly flush with the top of the paste-board carton 34, and with the terminals 31 and 33 of the battery protruding therefrom. The structure thus made is rigid and compact.

Through the use of metal cathode backing-plates electrically connected at many points to adjacent anodes and each making intimate contact with the superimposed carbonaceous mix, and through the establishment of an intimate contact of wide area between the carbonaceous mixture and the depolarizing mix cake, and through the use of a thin layer of electrolyte of high conductivity, and through the use of an anode of broad area, a low internal resistance through each cell and through each series of cells is assured. For some battery uses, this is highly important.

Many modifications in structural details may be made without departing from the spirit of the invention as defined by the appended claims.

When the anode of Fig. 10 is used, the frame 14 of insulating material gives to the structure as a whole a pan-like shape, so that when assembled, as shown in Fig. 11, the insulating frame 14 will space the adjacent cathode-plate from the anode. In this modification, as in that heretofore described, the tinfoil sheet 18 can be bent down and perforated by the serrated edge 13, and there can be soldered or welded in position. The chamber formed within the spacing frame 14 serves as an expansion chamber of the same type as when the metal anode is of the pan construction.

In place of a metal cathode backing-plate, we may use a baked carbon plate 36, as shown in Fig. 13. This can be made in the same way that battery carbons are ordinarily made, but preferably should be thin. To overcome the difficulty of making an electrical connection to the edge of such a thin carbon plate, we prefer to provide one or more of its edges with a narrow layer 37 of copper or like metal put on as by electroplating. The method of assembly is the same as when a tinfoil backing-plate is used, excepting that to establish electrical connection between the edge of the carbon plate and the adjacent anode of the next cell, we prefer to wrap around the edges, a metal strip or clip 38, soldered to both plates, as shown in Fig. 16.

Fig. 14 shows a modified form of cathode-supporting plate consisting essentially of a metal or carbon base 39 carrying a thin adherent film or smear 40 of carbonaceous material and binder. The carbonaceous material which may be graphitic in character, is finely divided, and there may be used as a binder, a mixture of rosin, linseed oil and paraffin. Such an electrode member, if it has a carbon base, should be equipped with a metal edge 41, put on by electroplating. The method of assembly is essentially the same as that illustrated in Fig. 16.

Fig. 15 shows a still further modification, wherein a metal or baked carbon base 42 is first covered over with a thin film of adhesive 43, such as gutta percha or a mixture of rosin and mineral oil; then a layer of carbon particles 44, with or without a binder, is spread on the adhesive and forced down through the adhesive so that the carbon particles, which may be relatively coarse or granular, puncture the adhesive and make good electrical contact with the rigid conducting plate or base 42.

Other changes in detail will readily suggest this to those skilled in the art.

When the cells are in use, and particularly when on heavy duty, expansion of the paste and liberation of gases will occur, as in cells of the cylindrical type. On very heavy discharge, a thick syrupy liquor, high in zinc chloride content, may separate from the main body of the electrolyte. The construction above described affords the great advantage that there is a convenient overflow space or chamber into which the paste and gas may expand and into which any zinc chloride concentrate may run. The expansion chamber provided by us is of ample size and is in free communication with the electrolyte through perforations in the zinc anode. These expedients, so far as we are advised, are new in dry-cells of the plate type.

There is the further important advantage inherent in our construction that the formation of a hole in a zinc anode, through prolonged use of the cell and corrosion at the anode, offers no serious disadvantage. In other words, the cell will continue to function after a large part of the zinc anode has been entirely eaten away through the corrosion incident to normal action of the cell. Because of this peculiarity, the zinc anode may be made from zinc sheets of lighter gauge than is customary in dry-cell practice.

Throughout the entire cell there is adequate room for all of the elements, and it is very easy to proportion the weight or thickness of one element to the weight or thickness of the others, so that maximum electrical output per unit of total weight is attained. And this is true whether the cell be of the pasted type or of the card-board liner type.

Use of a gelatinized electrolyte offers many advantages, and, as will be apparent, this electrolyte may be of a self-setting character or of a composition which sets only on the application of heat. There is no tendency for the cells to break their joints because of accumulated gas pressure, for any liberated gas finds ready passage into the expansion chamber and from that chamber, under high pressure, it works its way out slowly through the oil treated paper cover. Nevertheless that oil treated paper cover keeps air out of the cell where it would do great damage, as by drying up the electrolyte and promulgating local corrosion on open circuit.

We claim:

1. In a dry cell, a metal electrode in the shape of a shallow pan, the depressed portion of the pan being perforate and bearing projections having approximately the same height as the sides of said pan.

2. In a dry cell, a zinc electrode in the shape of a shallow rectangular perforate pan, and a plurality of stops pressed up from the bottom of the pan, and having a height comparable to the height of the pan's sides.

3. In a dry cell the combination of a cathode having a carbonaceous face, a depolarizing mixture contacting with said carbonaceous face, a collar resistant to zinc chloride and enclosing the edges of said depolarizing mixture, a layer of gelatinized electrolyte within said collar, and a metal anode resting on said collar and contacting with said paste.

4. In a dry cell the combination of a cathode having a carbonaceous face, a depolarizing mixture contacting with said corbonaceous face, a collar resistant to zinc chloride and enclosing the edges of said depolarizing mixture, an electrolyte contacting with said depolarizing mixture, and an anode in the form of a shallow pan resting on said collar and contacting with said electrolyte.

5. In a dry cell the combination of a cathode having a carbonaceous face, a depolarizing mixture contacting with said carbonaceous face, a collar resistant to zinc chloride and enclosing the edges of said depolarizing mixture, an electrolyte contacting with said depolarizing mixture, a perforate metal anode resting on said collar and contacting with said electrolyte, and means forming an expansion chamber on the other side of said anode.

6. In a dry cell the combination of a cathode having a carbonaceous face, a depolarizing mixture contacting with said carbonaceous face, a collar resistant to zinc chloride and enclosing the edges of said depolarizing mixture, a layer of gelatinized electrolyte within said collar, a perforate rectangular metal anode in the form of a shallow pan resting on said collar and contacting with said paste, and means forming an expansion chamber on the other side of said anode.

7. In a dry cell of the plate type, opposed electrodes spaced apart by a collar of fibrous material impregnated with polymerized tung oil.

8. In a dry cell of the plate type, a cathode, an opposed metal anode in the form of a shallow pan, and a collar spacing said electrodes from one another and on an edge of which said anode is seated, said collar being impregnated with material resistant to zinc chloride.

9. In a dry cell of the plate type, an anode, an opposed cathode spaced therefrom by a collar of fibrous material, said anode being perforate, and chloride resistant insulating material placed over said perforate anode.

10. In a dry cell of the plate type, a perforate anode in the form of a shallow pan, an opposed cathode spaced therefrom by a collar impregnated to resist the action of zinc chloride, and a layer of fibrous material on the other side of said anode and forming therewith a sealed expansion chamber.

11. In a dry battery of the plate type, electrodes of opposed polarity spaced apart and insulated by fibrous material impregnated with polymerized tung oil.

12. In a dry battery of the plate type, electrodes of opposed polarity spaced apart and insulated by fibrous material impregnated with polymerized tung oil, one of said electrodes being perforate and forming with said fibrous material a sealed expansion chamber.

13. In a dry battery of the plate type, electrodes of opposed polarity spaced apart and insulated by a layer of paper impregnated with polymerized tung oil, one of said electrodes being in the form of a shallow perforate pan and forming with said paper a sealed expansion chamber.

14. In a battery of the plate type, opposed electrodes spaced apart by a collar of fibrous material impregnated with polymerized tung oil, one of said electrodes being in the form of a rectangular perforate shallow pan seated on said collar, and a layer of paper impregnated with polymerized tung oil and covering said pan-shaped electrode to form therewith a sealed expansion chamber.

15. As an article of manufacture, a dry cell electrode in the shape of a shallow pan, the depressed portion of the pan being perforate and carrying projections of approximately the same height as the rim of said pan.

16. As an article of manufacture, a zinc dry cell electrode in the shape of a shallow pan and having a serrated edge.

In testimony whereof we affix our signatures.

OLIVER W. STOREY.
JAMES GARFIELD ZIMMERMAN.

CERTIFICATE OF CORRECTION.

Patent No. 1,737,130.   Granted November 26, 1929, to

OLIVER W. STOREY ET AL.

It is hereby certified that the assignee in the above numbered patent was erroneously described and specified as "C. F. Burgess Laboratories, Inc., of Madison, Wisconsin, a Corporation of Delaware", whereas said assignee should have been described and specified as "Burgess Battery Co., of Madison, Wisconsin, a Corporation of Wisconsin, as shown by the records of assignments in this office; and that the said Letters Patent should be read with this correction therein that the same may conform to the record of the case in the Patent Office.

Signed and sealed this 31st day of December, A. D. 1929.

(Seal)

M. J. Moore,
Acting Commissioner of Patents.

on the other side of said anode and forming therewith a sealed expansion chamber.

11. In a dry battery of the plate type, electrodes of opposed polarity spaced apart and insulated by fibrous material impregnated with polymerized tung oil.

12. In a dry battery of the plate type, electrodes of opposed polarity spaced apart and insulated by fibrous material impregnated with polymerized tung oil, one of said electrodes being perforate and forming with said fibrous material a sealed expansion chamber.

13. In a dry battery of the plate type, electrodes of opposed polarity spaced apart and insulated by a layer of paper impregnated with polymerized tung oil, one of said electrodes being in the form of a shallow perforate pan and forming with said paper a sealed expansion chamber.

14. In a battery of the plate type, opposed electrodes spaced apart by a collar of fibrous material impregnated with polymerized tung oil, one of said electrodes being in the form of a rectangular perforate shallow pan seated on said collar, and a layer of paper impregnated with polymerized tung oil and covering said pan-shaped electrode to form therewith a sealed expansion chamber.

15. As an article of manufacture, a dry cell electrode in the shape of a shallow pan, the depressed portion of the pan being perforate and carrying projections of approximately the same height as the rim of said pan.

16. As an article of manufacture, a zinc dry cell electrode in the shape of a shallow pan and having a serrated edge.

In testimony whereof we affix our signatures.

OLIVER W. STOREY.
JAMES GARFIELD ZIMMERMAN.

---

CERTIFICATE OF CORRECTION.

Patent No. 1,737,130.    Granted November 26, 1929, to

OLIVER W. STOREY ET AL.

It is hereby certified that the assignee in the above numbered patent was erroneously described and specified as "C. F. Burgess Laboratories, Inc., of Madison, Wisconsin, a Corporation of Delaware", whereas said assignee should have been described and specified as "Burgess Battery Co., of Madison, Wisconsin, a Corporation of Wisconsin, as shown by the records of assignments in this office; and that the said Letters Patent should be read with this correction therein that the same may conform to the record of the case in the Patent Office.

Signed and sealed this 31st day of December, A. D. 1929.

(Seal)

M. J. Moore,
Acting Commissioner of Patents.